Patented Aug. 30, 1949

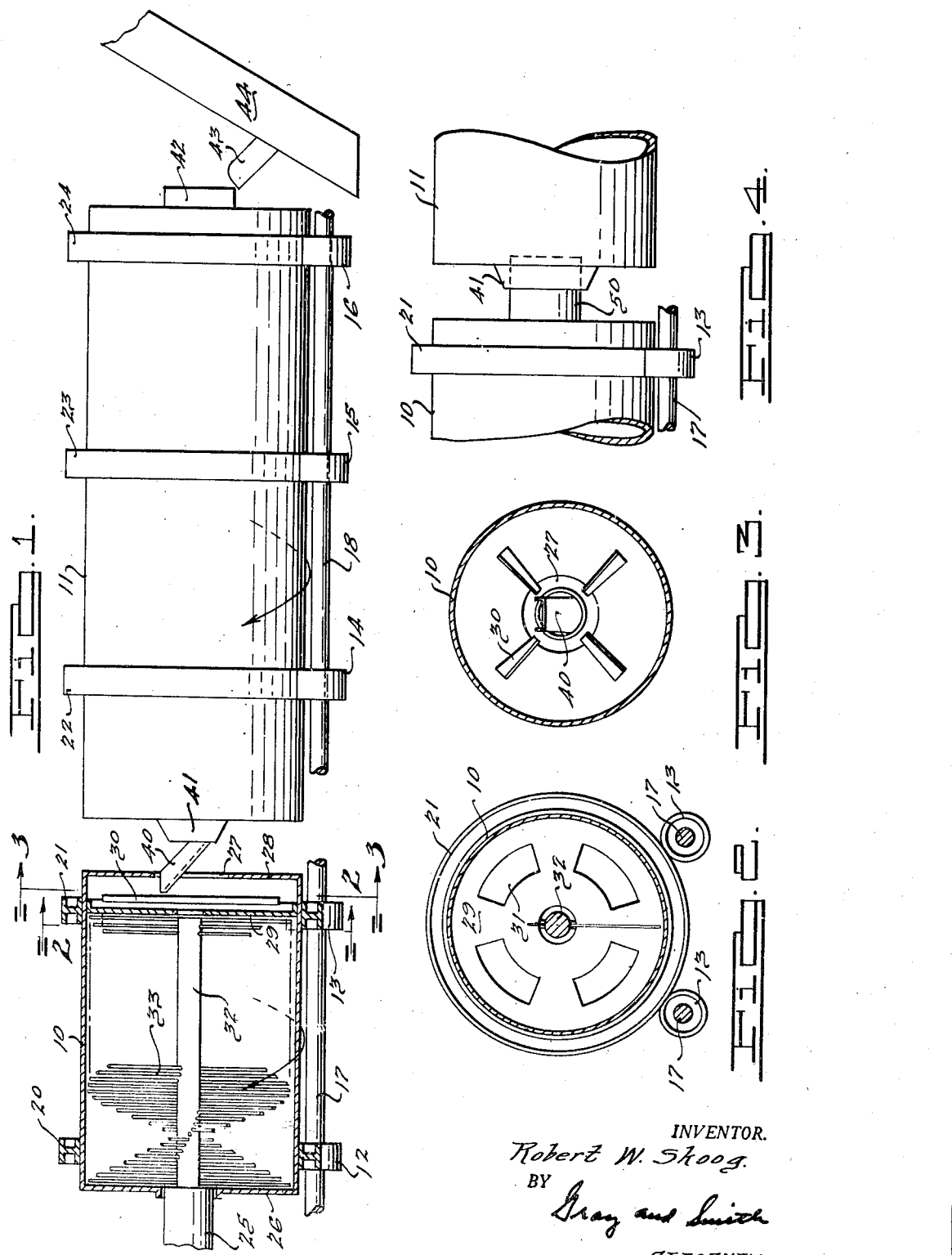

2,480,782

UNITED STATES PATENT OFFICE 2,480,782

PELLETING OF CARBON BLACK

Robert W. Skoog, Borger, Tex., assignor to United Carbon Company, Inc. (Maryland), Charleston, W. Va., a corporation of Maryland Application January 1, 1945, Serial No. 570,973

5 Claims. (Cl. 252—57)

The present invention relates to the agglomeration of finely divided flocculent powders, such for example as carbon black, for the purpose of agglomerating the fine dusty material and to form it into small masses which may be handled and shipped in bulk. It has been found that the formation of small agglomerates permits the bulk handling of such materials in an economical and commercial manner, and reduces a given mass of the flocculent powder, to a fraction of its untreated bulk or volume without substantial impairment of the working qualities or dispersion properties of the treated flocculent powder.

The apparatus of the present invention is particularly adapted to form easily handled agglomerates or shaped masses of finely divided flocculent powders, such for example as carbon black, for the purpose of overcoming objectionable properties in the handling and shipping of such materials.

In an important example of the present invention carbon black may be taken as the finely divided flocculent powder to be treated. The term "carbon black" as used herein, is used in its broadest sense to include lamp black, gas black produced by various processes as well as other carbon black substitutes commonly employed as pigments or fillers. It is to be understood, however, that the apparatus of the present invention may be successfully utilized in treating other finely divided flocculent powders.

It is a principal object of the present invention to provide an apparatus for treating flocculent powders to form shaped agglomerates therefrom which are capable of ready and uniform dispersion in a selected dispersion medium, the agglomerates occupying a decreased space and being more readily shipped, stored and handled than the unagglomerated flocculent powder.

It is a further object of the present invention to provide an apparatus adapted for use in the manufacture of agglomerated flocculent powders, such as carbon black, on an economical and commercial basis to assure a large scale production of commercially uniform agglomerates.

It is a further object of the present invention to provide an apparatus for the commercial manufacture of agglomerates of finely divided flocculent powders, such for example as carbon black, which may be readily controlled and in which the dispersibility of the finely divided solid material is not adversely affected as a result of the processing.

It is a further object of the present invention to provide an apparatus for the commercial manufacture of agglomerates of finely divided flocculent powders which is adapted for a continuous operation in which the agglomerated material is fed in a predetermined path toward the discharge end of the apparatus in such a manner as to assure the substantially complete agglomeration and the substantially uniform treatment of the entire mass of the powdered material fed to the apparatus.

A further object of the present invention is to provide an improved apparatus for treating flocculent powders in a continuous operation to form agglomerates of a relatively uniform size which are non-adherent and of sufficient density to resist ready displacement during handling and use, the agglomerates themselves being readily crushed by the pressures normally exerted in conventional types of dispersion equipment so that the agglomerates may be readily broken up to make the individual particles of the finely divided solid material available to form satisfactory dispersions.

Carbon black is an important material in many technical industries and the apparatus of the present invention has a particular application to the agglomerating of finely divided carbon black particles. As originally produced carbon black has a specific weight of from approximately three pounds to approximately ten pounds per cubic foot. By a densifying operation the specific weight of the carbon black may be somewhat further increased depending upon the type of densifying operation, the type of apparatus used, and the type of carbon black. By further treatment, the carbon black in its agglomerated form may have its specific weight increased to approximately twenty-two pounds or more per cubic foot.

The apparatus of the present invention utilizes a plurality of revolving horizontal drums or cylinders mounted upon power driven trunnion wheels. A spined rolling punch shaft having spines or punch arms mounted in the form of a helix about a central shaft is placed in the first of said drums and operates as a free-rolling member which mixes the material entering the drum and prevents the accretion of the material on the interior walls and ends of the said drum. The mass of material in the drum takes the form of a smoothly rolling segment of a circle somewhat distorted due to the rolling action. Near the inlet end of the drum, the cross-section of the mass presents an outer envelope in which round agglomerates predominate. In the central portion of the mass there is a large body of unagglomerated powder. Unless this condition is broken up, accretions of the unagglomerated powder will form and stick to the walls of the drum. The spined punch shaft assures a proper blending of the unagglomerated powder and the agglomerated black while in addition, the spined shaft performs the purely mechanical function of breaking loose any adherent powder before it forms a cake on the walls of the drum.

An apparatus embodying the present invention

Fig. 1 is a side elevation partially in section of the apparatus embodying the present invention.

Fig. 2 is a section taken substantially on the line 2—2 of Fig. 1 looking in the direction of the arrows.

Fig. 3 is a section taken substantially on the line 3—3 of Fig. 1 looking in the direction of the arrows.

Fig. 4 is a fragmentary side elevation showing a modified apparatus embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the apparatus of the present invention comprises a plurality of separate horizontal drums, in the present instance, the two drums 10 and 11 which may be mounted substantially coaxially for separate rotation on rotating trunnions 12 and 13 and 14, 15 and 16, respectively. The trunnions 12 and 13 are mounted on shafts 17 which are power driven by any suitable power means so as to rotate the drum 10 at speeds within the limits of from approximately one and one-half revolutions to approximately twelve revolutions per minute. The trunnions 14, 15 and 16 are mounted on shafts 18 which are suitably connected with a power source for rotation at such a speed that the drum 11 is rotated at a speed within the limits of from approximately eight to twelve revolutions per minute. If desired, the drum 10 may be so mounted that its longitudinal axis lies in a vertical plane above the longitudinal axis of the drum 11 so that material flowing from the drum 10 may drop by gravity into the feed end of the drum 11.

The drum 10 is provided with circumferential tracks 20 and 21 which support the drum on the trunnion 12 and 13. The drum 11 is provided with circumferential tracks 22, 23 and 24, which support the drum for rotation on the trunnions 14, 15 and 16, respectively. The drum 10 is provided with an inlet 25 which communicates with the interior of the drum 10 through the end partition 26. A discharge opening 27 is provided in the other end 28 of the drum 10. Spaced from the end 28 is a perforated partition 29 having a plurality of cups 30. One cup 30 is located adjacent each of the plurality of perforations 31.

A spined punch shaft 32 is mounted in the drum 10 ahead of the partition 29 and is provided with a plurality of radially extending spines or punch arms 33 to provide a plurality of spaced point contacts on the interior walls of the drum 10.

The spined punch shaft 32 prevents the accretion of the unagglomerated powdered materials on the walls of the drum and effects a proper blending of the materials. The arrangement of the spines or punch arms 33 on the shaft is that of a double helix with each of the spined arms extending through the shaft. With this construction it has been found that end movement of the shaft within the chamber is largely eliminated.

A chute 40 extends through the opening 27 and discharges into the inlet opening 41 of the second drum 11. The drum 11 has a smooth interior and no spined punch shaft is required therein. It has been found that by rotating the drum 11 at a relatively higher rate of speed than the drum 10, that the partially aggregated or agglomerated material passing from the drum 10 through the chute 40 is further densified and that the aggregates are polished and given the suostantial uniformity of size and the strength properties which are desired. The agglomerates are discharged from the drum 11 through the discharge opening 42, and into a chute 43 leading to a bulk conveyor 44. If desired, other drums, similar to the drum 11 may be provided to further refine the produced aggregates.

If desired, a portion of the formed pellets delivered to the chute 44 may be fed to the inlet opening 25 to provide a continuous priming of the drum 10. In practice it has been found that from approximately ten per cent to approximately twenty per cent of the pellets discharged from the conveyor 44 may be utilized as such priming charge.

In the modification shown in Fig. 4, the drum 10 is provided with a discharge chute 50, which extends directly into the intake opening 41 of the drum 11 on a line extending substantially coaxially with the center line thereof.

It is preferred that the unagglomerated powders enter the drum 10 in a predensed condition as may be achieved, for example, by following the method and using the apparatus as disclosed in a co-pending application, although this is not essential. In agglomerating a so-called "soft" or "furnace" produced carbon black, it has been found that it may be predensified by utilizing the method and apparatus of said co-pending application so that the unagglomerated powders have a specific weight within the range of from approximately eighteen to approximately twenty-four pounds per cubic foot when delivered to the intake 25 of the drum 10. Carbon black having such density is preferably maintained in the drum 10 at a depth of less than approximately two-fifths of the diameter of the drum, and preferably from one-fifth to three-tenths of the diameter thereof. The drum 11 receives the material after treatment in the slower speed drum 10. The speed of rotation of the second drum and the depth of the material in this drum controls the hardness and size of the agglomerates formed therein. A speed of from approximately eight to approximately twelve revolutions per minute and using depths of material averaging from one-fifth to two-fifths of the diameter of the drum have been found to produce satisfactory agglomerates. However, with certain materials, the drum may be rotated as fast as sixteen revolutions per minute. Since the material being fed to the second drum has been agglomerated and formed into preliminary pellets in the slow speed drum, there is little or no accumulation or caking of this material on the walls of the second drum, and, therefore, it is not necessary to provide any devices therein to prevent the caking on the side walls. The mixing and agglomerating member in the drum 10 prevents accumulation or caking of the soft finely divided materials on the interior walls of the drum, and also blends the materials therein.

From the foregoing it will be seen that while the mass of material in the drum 10 takes the form of a smoothly rolling segment of a circle somewhat distorted due to the rolling action, as indicated on the drawings, the punch shaft disturbs and breaks up the cross-section of the mass. In so doing, it also prevents the formation of accretions of the unagglomerated powders on the walls.

The use of the relatively higher speed second drum has been found effective in producing a substantially uniformly sized dense agglomerated product. This is believed to be due to the tendency of large or over-size pellets to scour off in said drum and form a medium size pellet. At the same time, it is believed that the smaller pellets pick up the material lost by the larger pellets and so grow to the same predominate medium size. Thus the second drum is in effect a size-levelling or refining drum which also compacts the agglomerates and increases the specific weights thereof. For example, a satisfactory agglomerated carbon black product has been made with this apparatus, which upon test was found to have a specific weight of approximately thirty-three pounds per cubic foot. On a screen test this product was found to be composed of the following sized portions of agglomerates:

| | Per cent |
|---|---|
| Retained on 16-mesh screen | 0.15 |
| Retained on 60-mesh screen | 96.15 |
| Retained on 100-mesh screen and | 2.83 |
| Passed through 100-mesh screen | 0.87 |

The product had a satisfactory hardness and possessed satisfactory properties for dispersion in end products with which the material was intended for use. It was formed from a so-called "soft" or "furnace type" of carbon black which had been densified by treatment in the apparatus and according to the method of a co-pending application and had a specific weight of approximately 18 pounds per cubic foot when delivered to the intake end of the drum 10.

I claim:

1. Apparatus for agglomerating finely divided powders and comprising a plurality of separately rotatable axially aligned drums, means for rotating said drums at different speeds and a free rolling mixing and blending punch shaft member in the first of said drums to which the finely divided powders are supplied, said punch shaft member comprising a central shaft having a plurality of separate spine members extending through said shaft at spaced points on a double helix.

2. Apparatus for agglomerating finely divided powders and comprising a plurality of separate rotatable axially aligned drums, means for rotating said drums at different speeds and a free rolling mixing and blending member in the first of said drums and comprising a spined punch shaft having a plurality of radially extending spines having ends contacting the inner wall of said drum at a plurality of spaced points on a double helix.

3. Apparatus for agglomerating finely divided powdered materials and comprising a plurality of separate axially aligned rotatable drums, means for rotating said drums at different speeds, a mixing and blending member in the first of said drums and comprising a central shaft having a plurality of radial arms extending through said shaft at spaced points on a helix extending longitudinally and circumferentially of said shaft, means for feeding said materials from one of said drums to another of said drums, and comprising a chute extending from one of said drums to another of said drums, a perforated partition in the end of the said first named drum adjacent said chute, a plurality of cups on said perforated partition adapted to pick up and convey said materials from the end of said drum and to discharge it into said chute.

4. Apparatus for agglomerating carbon black and comprising a pair of separate horizontally disposed rotatable drums, means for rotating the first of said drums at a speed within the limits of from approximately one and one-half to approximately twelve R. P. M., means for rotating the second of said drums at a speed of from approximately ten to approximately twelve R. P. M., an inlet for supplying unagglomerated carbon black to said first named drum, a chute for supplying carbon black from said first named drum to said second named drum, and a duct for discharging the agglomerated carbon black from said second drum, and means comprising a perforated partition adjacent the discharge end of said first named drum, a cup on said partition adjacent each perforation thereof, said cups being adapted to pick up and convey carbon black from the discharge end of said drum to said chute, and a carbon black mixing and blending member in said first drum and comprising a spined punch shaft extending longitudinally through said first named drum, and having a plurality of radially extending arms spaced on a double helix and having ends thereon to provide a plurality of spaced point contacts with the interior walls of said first named drum.

5. Apparatus for agglomerating carbon black and comprising a pair of separate horizontally disposed rotatable drums, means for rotating the first of said drums at a speed within the limits of from approximately one and one-half to approximately twelve R. P. M., means for rotating the second of said drums at a speed of from approximately ten to approximately twelve R. P. M., an inlet for supplying unagglomerated carbon black to said first named drum, a chute for supplying carbon black from said first named drum to said second named drum, and a duct for discharging the agglomerated carbon black from said second drum, and means comprising a perforate partition adjacent the discharge end of said first named drum to convey carbon black therefrom to said second named drum, and a mixing and blending member located in said first named drum and comprising a spined punch shaft extending longitudinally through the forepart of said first named drum, and having a plurality of radially extending arms spaced on a double helix and having ends thereon to provide a plurality of spaced point contacts with the interior walls of said drum.

ROBERT W. SKOOG.

REFERENCES CITED

The following references are of record in the file of this patent:

UNITED STATES PATENTS

| Number | Name | Date |
|---|---|---|
| Re. 21,379 | Glaxner | Mar. 5, 1940 |
| 1,152,496 | Eddy | Sept. 7, 1915 |
| 1,980,130 | Fasting | Nov. 6, 1934 |
| 2,131,686 | Heller et al. | Sept. 27, 1938 |
| 2,185,158 | Price | Dec. 26, 1939 |
| 2,256,949 | McKinney | Sept. 23, 1941 |
| 2,288,087 | Hanson et al. | June 30, 1942 |
| 2,332,057 | Carney | Oct. 19, 1943 |